United States Patent [19]

Lehmann et al.

[11] 4,117,038
[45] Sep. 26, 1978

[54] STORABLE, RAPIDLY HARDENING EPOXY RESIN ADHESIVE

[75] Inventors: Hans Lehmann, Aesch; Helmut Zondler, Bottmingen, both of Switzerland

[73] Assignee: Ciba-Geigy Corporation, Ardsley, N.Y.

[21] Appl. No.: 864,285

[22] Filed: Dec. 27, 1977

[30] Foreign Application Priority Data

Jan. 7, 1977 [CH] Switzerland .............................. 172/77

[51] Int. Cl.$^2$ .............................................. C08L 63/00
[52] U.S. Cl. ................................ 260/837 R; 260/836; 528/120
[58] Field of Search ............................ 260/837 R, 836

[56] References Cited

U.S. PATENT DOCUMENTS

| | | | |
|---|---|---|---|
| 3,201,374 | 8/1965 | Simms | 260/837 R |
| 3,496,250 | 2/1970 | Czerwinski | 260/836 |
| 3,519,576 | 7/1970 | Johnson | 260/2 |
| 3,520,905 | 7/1970 | Johnson | 260/345.2 |
| 3,860,541 | 1/1975 | Lehmann | 260/18 PN |

FOREIGN PATENT DOCUMENTS 2,423,843 11/1975 Fed. Rep. of Germany.

Primary Examiner—Paul Lieberman
Attorney, Agent, or Firm—Vincent J. Cavalieri; Joseph F. DiPrima

[57] ABSTRACT

A storable, rapidly hardening epoxy resin adhesive consisting essentially of
  a. a polyglycidyl compound having a softening temperature between 40° and 90° C,
  b. a salt of 1 mole of ethylenediamine, 1 mole of bisphenol A and 2 g of N,N-dimethyl-1,3-diaminopropane,
  c. an ABS graft polymer and
  d. a copolymer of ethylene, acrylic acid and acrylate having a melting range from 70° to 110° C, said adhesive comprises, per 1 equivalent of glycidyl groups, 0.5 to 1.5 equivalents of hydrogen atoms bonded to nitrogen of ethylenediamine and of N,N-dimethyl-1,3-diaminopropane, and per 100 parts of the polyglycidyl compound contains 3 to 30 parts by weight of the ABS graft polymer and 3 to 20 parts by weight of the copolymer of ethylene, acrylic acid and acrylate, and said adhesive is in the form of a fine heterogeneous powder.

5 Claims, No Drawings

STORABLE, RAPIDLY HARDENING EPOXY RESIN ADHESIVE

The invention relates to storable epoxy resin compositions which harden sufficiently rapidly at temperatures between 80° and 100° C and which are used in particular as adhesives.

A large number of different single component epoxy resins suitable for bonds and having a good shelf life are already known. An old known system consists for example of the actual epoxy resin based on bisphenol A or another polyphenol and dicyandiamide as hardener. This single component resin, which is chiefly used as a powder, has however the disadvantage that it can only be cured at temperatures above 100° C. The incorporation of aromatic or cycloaliphatic amines in solution or in the melt instead of dicyandiamide into the above epoxy resins results in single component epoxy resins which do have the advantage of more rapid curing even at lower temperatures, but which at the same time have an unsatisfactory shelf life.

Very useful, storable epoxy resin adhesives are the systems claimed in U.S. Pat. No. 3,860,541, which contain as basic constituents a cyclic polyglycidyl compound with a softening temperature between 40° and 140° C, a free amino group containing adduct of an epoxy resin and an aromatic or cycloaliphatic amine and triethylenetetramine or a polyaminoamide of dimerised fatty acids.

Using such adhesives, it is possible to obtain good adhesive values by curing for 10 minutes at 120° C. The tensile shear strength according to DIN 53 282 is about 20 N/mm$^2$ and the peel strength according to British Standard DTD 5577 is about 4 N/mm. However, if even lower temperatures are used during the curing, for example 80° C, then longer times of about 60 minutes are necessary to produce a still useful bond. The tensile shear strength is then only 5 N/mm$^2$.

In Table III of U.S. Pat. Nos. 3,519,576 and 3,520,905, liquid epoxy resin mixtures are mentioned which contain as hardeners crystalline polyamine salts of polyhydric phenols (for example ethylenediamine bisphenol A). It goes without saying that such liquid resin systems are virtually non-storable, and they have a reported shelf life of 1 day. All other epoxy resin systems mentioned in both these U.S. patent specifications either have the disadvantage that they also have an inadequate shelf life or that a curing at temperatures between 90° and 100° C cannot be carried out in a sufficiently short time or does not result in a sufficiently good adhesion.

It is the task of the invention to provide epoxy resin adhesives with an adequate shelf life which, using still shorter curing times at temperatures between 80° and 100° C, produce even stronger bonds than can the epoxy resin mixtures of the described prior art at curing temperatures of up to 100° C. The solution of this technical problem is of great importance especially in those fields in which plastics having relatively low softening ranges, such as ABS polymers, polyethylene and PVC, are to be bonded in as large a quantity as possible. The ski manufacturing industry may be mentioned here as a particular example.

Accordingly, the invention provides a storable, rapidly hardening epoxy resin adhesive which contains a. a polyglycidyl compound containing on average more than one glycidyl group in the molecule and having a softening temperature between 40° and 90° C, b. a salt of 1 mole of ethylenediamine, 1 mole of bisphenol A and 2 g of N,N-dimethyl-1,3-diaminopropane, c. an ABS graft polymer and d. a copolymer of ethylene, acrylic acid and acrylate having a melting range from 70° to 110° C, such that said epoxy resin adhesive contains, per 1 equivalent of glycidyl groups, 0.5 to 1.5 equivalents of hydrogen atoms bonded to nitrogen of ethylenediamine and of N,N-dimethyl-1,3-diaminopropane, and per 100 parts of the polyglycidyl compound contains 3 to 30 parts by weight of the ABS graft polymer and 3 to 20 parts by weight of the copolymer of ethylene, acrylic acid and acrylate, and is in the form of a fine heterogeneous powder, optionally processed to tablets or granules, such that one category of particles contains the respective polyglycidyl compound and another category of particles contains the salt of 1 mole of ethylenediamine, 1 mole of bisphenol A and 2 g of N,N-dimethyl-1,3-diaminopropane, and the particles of a third category consist of the copolymer of ethylene, acrylic acid and acrylate.

Surprisingly, it was possible to solve the task of the invention by means of the above composition. On curing at 90° C (10 minutes), it was possible to increase the peel strength of corresponding bonds to 6 to 9 N/mm as against 4 N/mm in the system of U.S. Pat. No. 3,860,541.

The epoxy resin adhesives of the present invention contain as polyglycidyl compound (a) preferably solid bisphenol A epoxy resins or glycidylated phenol or cresol novolaks. In principle, mixtures of such solid and liquid glycidyl compounds can also be used, in so far as these mixtures have a softening temperature between 40° and 90° C.

The salt of 1 mole of ethylenediamine, 1 mole of bisphenol A and 2 g of N,N-dimethyl-1,3-diaminopropane contained in the adhesive of the invention is prepared in simple manner by fusing all the starting materials together. In principle, however, it is also possible to prepare the salt in solution and subsequently to separate the solvent again.

Those adhesives which contain as copolymer (d) 87 to 91% by weight of ethylene, 3 to 5% by weight of acrylic acid and 6 to 8% by weight of acrylate, constitute a preferred embodiment of the adhesives of the present invention.

Observed with the naked eye, the adhesives of the present invention are substantially homogeneous powders. However, in reality, they are multiphase powders with a colloidal to low disperse distribution. In general, the powders have only three categories of particles. The first category contains the respective epoxy resin and optionally further non-reacting mixture ingredients. The second category contains the salt of 1 mole of ethylenediamine, 1 mole of bisphenol A and 2 g of N,N-dimethyl-1,3-diaminopropane which acts as hardener, and optionally further non-reacting mixture ingredients. The ABS graft copolymer can be contained in one of the two powders or in both. The particles of the third category consist of the copolymer of ethylene, acrylic acid and acrylate having a melting range of 70° to 110° C.

In principle, the adhesive of the present invention can also be in the form of a heterogeneous powder which contains more than three categories of particles. This means, inter alia, that, in addition to the two categories containing the reacting components and the category consisting of the copolymer, the powder mixture can contain further non-reacting ingredients as special categories of particles.

Non-reacting ingredients are in particular fillers, for example kaolin, chalk, quartz powder, powdered slate, heavy spar, talc, and lithopone.

The preparation of the adhesive powders of the present invention is carried out for example by initially grinding the polyglycidyl compound and the salt of ethylenediamine, bisphenol A and N,N-dimethyl-1,3-diaminopropane separately and afterwards mixing both fine powders intensively with the ABS graft polymer powder and the ethylene/acrylic acid/acrylate copolymer and optionally with further powders of non-reacting mixture ingredients until a homogeneous powder is obtained. In a modification of this procedure, it is also possible to mix all non-reacting ingredients, or a portion thereof, into the polyglycidyl compound or into the salt of ethylenediamine, bisphenol A and N,N-dimethyl-1,3-diaminopropane, preferably by fusion, before the preparation of the individual powders. The grinding to prepare the individual powders is then effected subsequently, and finally these powders are mixed together to give the adhesive.

In principle, the preparation of all or of individual powders can also be dispensed with, namely when the compact material of the precursors is ground jointly in a mill to a homogeneous powder.

However, the epoxy resin adhesives of the present invention do not necessarily have the original powder form, but can also be converted into granules. The known method of compacting can be used for example for this purpose. Very uniform granules are obtained by using tabletting machines.

The principal use of the epoxy resin adhesives of the present invention is in the field of ski construction. Chiefly powder, but also granulated, compositions are used.

In producing bonds with the epoxy resin adhesives of the present invention, it has proved advantageous to use coated fibre webs, woven materials, boards or sheets of plastics, glass or the like as intermediate layer between the surfaces to be bonded. In ski construction, this results for example in an elastic reinforcement of the laminate.

When preparing such fibre webs or the like coated with the adhesives of the invention, the starting substrates are preferably modified with a primer beforehand. Suitable primers are for example thermoplasts, for example polyvinyl formal or polyvinyl butyral or thermoplastic epoxy resins of the phenoxy type. They are applied to the substrate in solution. The epoxy resin is sprinkled in powder form onto the still moist substrate, which is afterwards dried.

Suitable primers are also liquid bisphenol A resins which contain polyamines (for example versamides) as hardeners and which crosslink at room temperature. If such resin systems are highly viscous, they can be used undiluted as primers; otherwise they are used in the form of solutions. In this case too, the powdery epoxy resin composition of the invention is sprinkled onto the still moist substrate treated with the primer. After drying the substrate and curing the primer, excess non-adhering powder is removed.

In many cases, the use of a primer can also be dispensed with and the powder is then pressed onto the substrate cold.

The fibre webs and the like coated with the adhesive also constitute an object of the invention.

In principle, the epoxy resin adhesives can also be used as moulding compounds or for powder coating and for the whirl sinter process.

EXAMPLE 1

A resin component is prepared as follow: 72 g of bisphenol A epoxy resin which is solid at room temperature and has an epoxide equivalent of 1043 and 7 g of a liquid bisphenol A epoxy resin with an epoxide equivalent of 190 are fused together at 130° C and the melt is mixed with 21 g of heavy spar. After cooling, the solid mixture is ground in a beater mill to a powder having a particle size between 60 and 300 $\mu$.

A hardener for the epoxy resin is prepared as follows: 1 mole of ethylenediamine, 1 mole of bisphenol A and 2 g of N,N-dimethyl-1,3-diaminopropane are heated (to about 120° C) until a homogeneous melt is formed. With stirring, 14 g of an ABS graft polymer in powder form (Novodur A-50, Bayer AG) having a particle size smaller than 500 $\mu$, a density of 1 g/ml and a powder density of 320 g/l, are then added. The resulting suspension is cooled to room temperature, whereupon the entire mixture solidifies. The solidified melt is ground in a beater mill to a powder having a particle size of less than 500 $\mu$.

The resin component powder (100 g) is mixed intensively with 10 g of the hardener powder, 5 g of a copolymer of ethylene, acrylic acid and acrylate (Lupolen powder A 2910, BASF AG) having a particle size of less than 300 $\mu$, and 0.5 g of a silicic acid powder prepared by hydrolysis of silicon tetrachloride in an oxyhydrogen flame (Aerosil 2431/380, Degussa AG). The finely powdered product thereby obtained is an epoxy resin adhesive of the invention which has the following features:

softening point (Kofler bench) : 48° to 58° C
shelf life at 20° to 25° C : longer than 6 months
curing time at 80° C : 20 minutes; tensile shear strength (DIN 53 283): 8-10 N/mm$^2$ peel strength (British Standard DTD 5577): 3-5 N/mm
curing time at 90° C : 10 minutes; tensile shear strength (DIN 53 283): 15-17 N/mm$^2$
curing time at 100° C: 8 minutes; peel strength (British Standart DTD 5577): 6-9 N/mm.

Comparison Example

The same resin component is used as in Example 1. The hardener is prepared as follows: 1 mole of ethylenediamine and 1 mole of bisphenol A are fused together. After the melt has solidified at room temperature, a powder having a particle size of less than 500 $\mu$ is prepared.

The resin component powder (100 g) is mixed intensively at room temperature with 0.5 g of silic acid powder (Aerosil) and 7.2 g of the hardener, affording a free-flowing single component adhesive powder having the following properties:

softening point (Kofler bench) : 50° to 60° C
shelf life at 20° to 25° C : longer than 6 months
curing time at 90° to 100° C : 10 minutes
test values obtained: tensile shear strength (DIN 53 282): 5 to 7 N/mm$^2$; peel strength (British Standard DTD 5577): 0.8 to 1.5 N/mm.

EXAMPLE 2

83 g of a solid epoxy cresol novolak having an epoxide equivalent of 230 are fused at 130° C and the melt is mixed with 17 g of heavy spar, cooled and ground to a powder having a particle size between 100 and 300 μ. This resin powder (100 g) is mixed intensively for 5 minutes with 26 g of the hardener powder described in Example 1, 0.5 g of "Aerosil" (Degussa) and 5 g of a copolymer powder of ethylene, acrylic acid and acrylate ("Lupolen powder A 2910", BASF) having a particle size of less than 300 μ. A single component adhesive powder having the following properties is obtained:

softening point (Kofler bench) : 66° to 70° C
shelf life at 20° to 25° C : longer than 6 months
curing time at 90° C : 8 to 10 minutes
curing time at 100° C : 10 to 12 minutes
tensile shear strength (DIN 53 283) : 8 to 11 N/mm$^2$
peel strength (British Standard DTD 5577): : 2 to 3 N/mm.

What is claimed is:

1. A storable, rapidly hardening epoxy resin adhesive which comprises
   a. a polyglycidyl compound containing on average more than one glycidyl group in the molecule and having a softening temperature between 40° and 90° C,
   b. a salt of 1 mole of ethylenediamine, 1 mole of bisphenol A and 2 g of N,N-dimethyl-1,3-diaminopropane,
   c. an ABS graft polymer and
   d. a copolymer of ethylene, acrylic acid and acrylate having a melting range from 70° to 110° C, said epoxy resin adhesive comprises, per 1 equivalent of glycidyl groups, 0.5 to 1.5 equivalents of hydrogen atoms bonded to nitrogen of ethylenediamine and of N,N-dimethyl-1,3-diaminopropane, and, per 100 parts of the polyglycidyl compound, 3 to 30 parts by weight of the ABS graft polymer and 3 to 20 parts by weight of the copolymer of ethylene, acrylic acid and acrylate, and is in the form of a fine heterogeneous powder.

2. An adhesive according to claim 1 wherein the polyglycidyl compound (a) is a bisphenol A epoxy resin.

3. An adhesive according to claim 1 wherein the polyglycidyl compound (a) is a glycidylated phenol or cresol novolak.

4. An adhesive according to claim 1 wherein the copolymer (d) consists of 87 to 91% by weight of ethylene, 3 to 5% by weight of acrylic acid, and 6 to 8% by weight of acrylate.

5. An epoxy resin adhesive according to claim 1 in the form of a fine heterogeneous powder which can be converted into granules by compacting or into tablets.

* * * * *